Patented Jan. 28, 1936

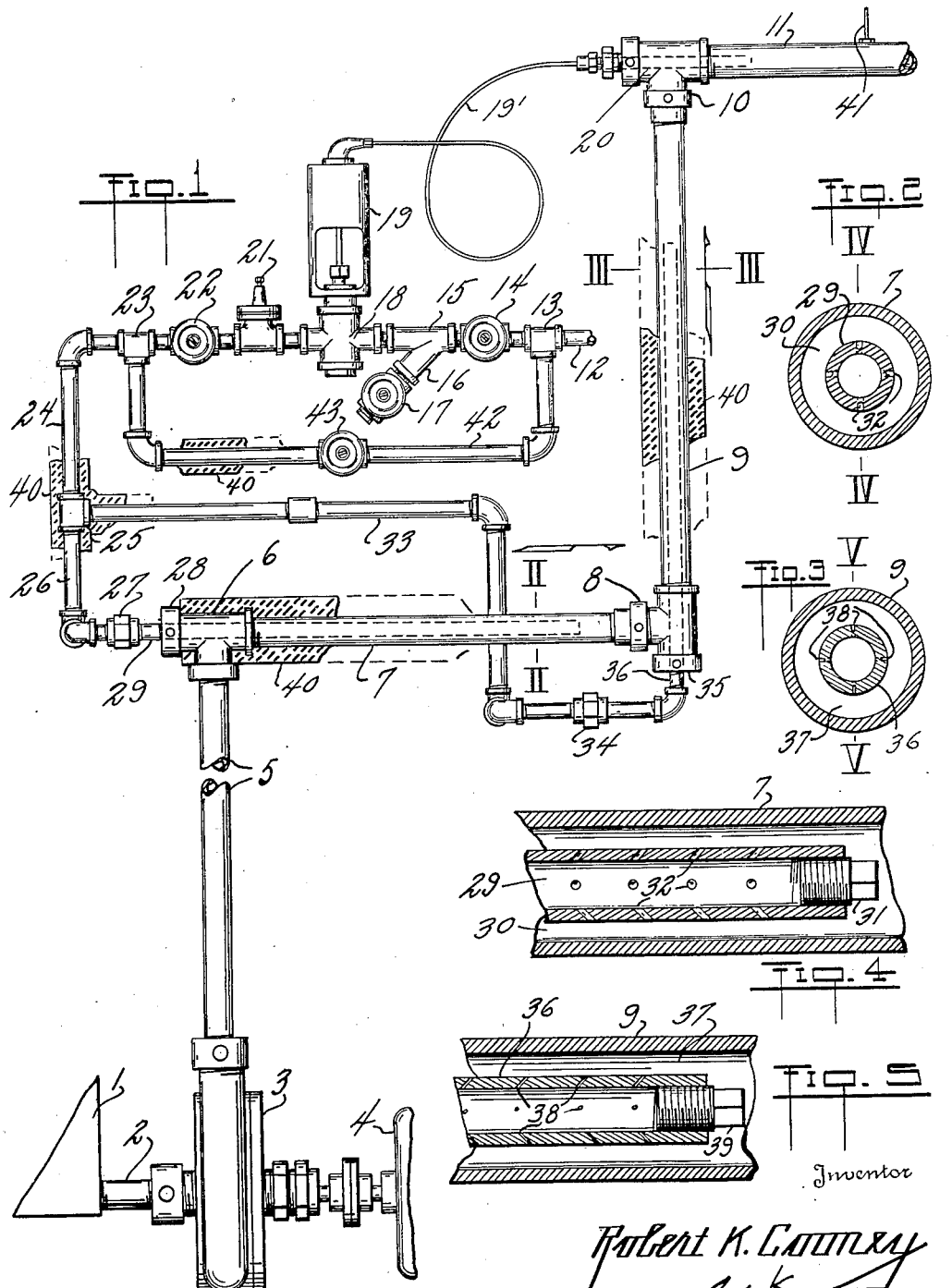

2,029,017

UNITED STATES PATENT OFFICE 2,029,017

PASTEURIZATION

Robert K. Cooney, Yankton, S. Dak., assignor of one-half to Frank J. Keating, Yankton, S. Dak.

Application March 22, 1934, Serial No. 716,853

10 Claims. (Cl. 261—15)

This invention relates to flash pasteurization.

This invention has utility when incorporated in continuous pasteurization of milk, cream, or other liquids.

Referring to the drawing:

Fig. 1 is a fragmentary view of an embodiment of the invention in a tubular and stage type of flash pasteurizer with controls therefor;

Fig. 2 is a section on the line II—II, Fig. 1;

Fig. 3 is a section on the line III—III, Fig. 1;

Fig. 4 is a section on the line IV—IV, Fig. 2; and

Fig. 5 is a section on the line V—V, Fig. 3.

In vat 1 the liquid may be raw milk or separator product, carrying say up to 30 or 35 per cent cream. Desirably, this material is at a held temperature which may be, say 65° F. From this vat 1, pipe 2 leads to rotary pump 3, herein shown as continuously driven by motor 4. From this pump 3 is riser 5 to fitting 6, from which extends 2-inch diameter sanitary pipe 7 to fitting 8. From this fitting 8 and at an angle from the pipe 7 extends second section or stage 9 of sanitary 2-inch pipe to fitting 10, having therefrom an upper line take-off pipe 11. There is thus provided a single, continuous passage for uniform flow in an approximately passage-filling liquid body of milk as impelled by the pump 3 in the travel from the vat 1 to the delivery pipe 11. Steam supply line 12, say for steam of a pressure of, say 100 pounds per square inch, extends to fitting 13 connected by manual control valve 14 to fitting 15 from which there is branch 16 as blow-off to be controlled by valve 17. There is thus provision to get rid of impurities which may be in the steam line.

From this fitting 15 line 12 extends to fitting 18 having thermostat control means 19, which may be of a pressure fluid type actuated from duct 19', having temperature responsive chamber 20 in the fitting 10. From this thermostatic control fitting 18 line 12 extends to reducing valve 21, thence past manually controllable fitting 22 to fitting 23 and therefrom connection is made by line 24 to fitting 25 having branch 26 connected by union 27 and gland 28 with the fitting 6. This union 27 has extending therefrom a three-quarter inch diameter brass tube 29 concentrically located in the tube 7 to provide an annular milk chamber or jacket 30 about this duct or pipe 29. This pipe 29 has terminal closure plug 31.

In four series, say twenty jets to a straight line longitudinally extending series when the 2-inch pipes are of a 36-inch length, are openings 32 in the duct 29, inclined at an angle of say 45° to the axis of duct 29 away from the fitting 6 toward the fitting 8. Each jet is one-eighth inch in cross section. These jets provide effective heating for the flowing volume of milk in the chamber 30. From the fitting 25, there extends pipe 33 to union 34 having connection through gland 35 to three-fourth inch brass pipe 36 in the pipe or chamber 9. This three-fourth inch brass pipe 36, concentrically disposed in the chamber 9, provides a second stage pasteurizing annular chamber as a second uniform cross section heating zone or jacket 37 about this pipe 36. In this pipe 36 are one-sixteenth inch diameter jet openings 38 in four lineal series in parallel and diverging into the chamber 37 at approximately 45° to and in the direction of liquid flow, that is, toward the fitting 10. The terminus of this pipe 36 is closed by plug 39.

At discontinuance of the operation of this two-stage flash pasteurization, the assembled set-up may be readily cleansed by disconnecting the unions 27 and 34. The union 27 may be swung clear of the line of the duct 29 as the gland 28 is removed to withdraw the pipe 29. It is only necessary to disconnect the gland 35 to withdraw the pipe 36. These pipes and stage chambers 30, 37, of the flash pasteurizer may have greater heat efficiency due to insulation jacketing 40 thereabout.

As an instance of operation, the thermostat may be set to maintain the temperature of the steam delivery into the liquid at from 190° to 210°. With this constantly maintained temperature, together with the 2-inch pipes 7, 9, providing approximately 3 foot length chambers, the apparatus may effectively handle as much as 15,000 pounds of liquid per hour. The handling in operation may be by adjusting the reducing valve 21 beyond a cooperating control range or the reducing valve may be adjusted to cooperate with the thermostat controlled valve in controlling the steam supply. In pressure control, which may be with a thermostat or even without the thermostat, by cutting out such thermostat control, this pressure reducing valve 21 may be set at, say 50 pounds when the supply of live steam is 100#. There is thus insured a high temperature dry steam. In practice, with the thermostat cut out, this pressure reducing valve may be adjusted for a desired control. In the event there be trouble with either the reducing valve or the thermostat or it is desired to reach some special condition by manual control, say from thermometer 41 in the line, the manually controlled valves 14, 22, may be closed and the live steam from the line 12 may be conducted from the fitting 13, by way of by-pass 42 and manually controlled valve 43 to the fitting 23.

This installation, as being essentially one of piping, does not involve cluttering up of floor space, but may even be located toward the ceiling or in a desired or convenient out-of-the-way place. There is no occasion for moving mechanical parts beyond the circulation-effecting pump. The chambers are entirely closed against atmospheric deterioration or contamination. The heating efficiency is high, for the liquid as milk which is being treated serves as a jacket for the heating source. Notwithstanding steam as the heating vapor is introduced into the traveling milk, effective pasteurization has been had with moisture increase as low as 1 per cent or even ½ per cent. Furthermore, this coarse jetting in the chamber 30 and the relatively finer jetting in the chamber 37 seems so to permeate the entire volume of the milk that the pasteurization is effectively thorough throughout with no deleterious taste or any caramelization. There is really produced hereunder a smoother product in this dispersion of the curds or milk solids. The installation is one simple to install and is economic in operation and upkeep, and thoroughly sanitary when adapted to food products such as milk and cream, which as passing through pipe 11 may be bottled, placed in storage or subjected to such other treatment as desired.

What is claimed and it is desired to secure by Letters Patent is:

1. A pasteurizer comprising a tubular chamber having an intake and a discharge, a concentric tubular heater having a plurality of linear series of parallel uniformly submerged jets directed into the chamber toward the discharge, a succeeding angularly-disposed chamber, a heater in said succeeding chamber having similar smaller-opening uniformly submerged jets, heater control means therefor and continuous uniform flow promotion means for material through the chamber.

2. Pasteurizing apparatus for liquids comprising an outer duct having a section to provide a uniform cross-section chamber therealong as a heating zone, an inner duct centered as to the outer duct in said zone, heating fluid supply means to the inner duct, there being a plurality of longitudinally extending series of inclined openings from the inner duct for spilling the heating fluid as jets into the liquid, and flow promotion means for causing the liquid to travel as a uniform cross-section stream filling the heating zone and moving through the zone while being heated by fluid flow from said jets, said travel of the stream being in the direction of the inclination of said jets in liquid travel in and from said heating zone.

3. A pasteurizer comprising a tubular chamber having an intake and a discharge, a concentric tubular heater therein having a plurality of uniformly submerged jets forming a heating zone in a section of said chamber, an additional chamber and heater forming a second heating zone, connecting means for said zones, and continuous uniform flow promotion means for material through said zones.

4. A flash pasteurizer having an intake and a discharge for the material to be pasteurized, flow promotion means for producing material-stream continuity between said intake and discharge, said pasteurizer between said intake and discharge having a tubular section with jet heating means therealong forming a heating zone of uniform cross-section for said stream flow as acted upon by said jet means, a heating medium supply for the jet means, a control valve for the supply, and a controller for the valve connected to said discharge.

5. Apparatus for effecting continuous pasteurization of a milk-containing liquid comprising a closed cylindrical chamber for isolating the liquid from atmospheric attack, inner concentric perforate wall means for condensing steam into the liquid to provide a heating zone in said chamber for the liquid, a pump for impelling the liquid to flow in a stream to, through and upward from the zone, a discharge duct for the liquid from the chamber above said heating zone effective to confine the stream to a uniform cross section and to an approximately chamber-filling liquid body through the zone while steam is condensing thereinto, and a control for the steam connected to the discharge duct.

6. Apparatus for effecting continuous pasteurization of a milk-containing liquid comprising a closed chamber for isolating the liquid from atmospheric attack, perforate wall means for condensing steam into the liquid to provide a heating zone in said chamber for the liquid, a discharge duct for the liquid from the chamber above said heating zone effective to confine the stream to uniform cross section and to an approximately chamber-filling liquid body through the zone while steam is condensed thereinto, and impelling means for the liquid to flow in a stream through and upward from the zone to said discharge duct.

7. Treating apparatus for liquids comprising an outer duct having a section to provide a uniform cross-section chamber therewith as a heating zone, an exteriorly symmetrical inner duct centered as to the outer duct in said zone, heating fluid supply means to the inner duct, there being a plurality of openings from the inner duct in series therealong for spilling the heating fluid as jets into the liquid an automatic control valve for the supply means, and flow promotion means for causing the liquid to travel as a uniform cross-section stream filling the heating zone and moving through the zone while being heated by heating fluid flow from the jets, said openings being inclined as to the direction of the flow of said liquid.

8. A flash treating apparatus having an intake and a discharge for the material to be treated, flow promotion means for producing material-stream continuity between said intake and discharge, said apparatus between said intake and discharge having a tubular section of symmetrical surface toward said liquid with jet heating means therealong forming a heating zone of uniform cross-section for said stream flow as acted upon by said jet means, a heating medium supply for the jet means, a control valve for the supply, a temperature responsive controller for the valve connected to said discharge.

9. Apparatus for effecting continuous treatment of a milk-containing liquid comprising a closed chamber for isolating the liquid from atmospheric attack, perforate wall means for directing steam into the liquid to provide a symmetrical cross-section heating zone extending longitudinally in said chamber for the liquid, a steam supply line connected to said perforate wall means, a discharge duct for the liquid from the chamber above said heating zone effective to confine the stream to uniform cross-section and to an approximately chamber-filling liquid body through the zone while steam is condensed thereinto, impelling means for the liquid to flow in a stream through and upward from the zone to said discharge duct and automatic control means connected from the discharge duct to the steam supply line to affect treatment of the liquid in the apparatus.

10. Treating apparatus for liquids comprising an outer duct having a section to provide an outer wall for a chamber therealong as a heating zone with an inlet port for a liquid to be treated and an outlet port for said liquid, an inner duct centered as to the outer duct in said zone to provide an inner wall opposing the outer wall and therewith forming a continuous uniform cross-section for said chamber, heating fluid supply means to the inner duct, there being a plurality of openings therealong from the inner duct between said ports and directed therethrough away from one port for spilling the heating fluid as jets into the liquid and toward the other port, and flow proportion means for causing the liquid to travel as a uniform cross section stream filling the said zone and moving through the zone from the inlet port toward the outlet port while being heated by fluid flow from said jets.

ROBERT K. COONEY.